(12) United States Patent
Amirpour et al.

(10) Patent No.: US 11,546,401 B2
(45) Date of Patent: Jan. 3, 2023

(54) FAST MULTI-RATE ENCODING FOR ADAPTIVE HTTP STREAMING

(71) Applicant: BITMOVIN, INC., San Francisco, CA (US)

(72) Inventors: Hadi Amirpour, Klagenfurt am Wörthersee (AT); Ekrem Çetinkaya, Klagenfurt am Wörthersee (AT); Christian Timmerer, Klagenfurt am Wörthersee (AT)

(73) Assignee: BITMOVIN, INC., San Francisco, CA (US)

( * ) Notice: Subject to any disclaimer, the term of this patent is extended or adjusted under 35 U.S.C. 154(b) by 0 days.

(21) Appl. No.: 17/090,802

(22) Filed: Nov. 5, 2020

(65) Prior Publication Data
US 2021/0144190 A1 May 13, 2021

Related U.S. Application Data

(60) Provisional application No. 62/932,417, filed on Nov. 7, 2019.

(51) Int. Cl.
*H04L 65/70* (2022.01)
*H04N 19/146* (2014.01)
(Continued)

(52) U.S. Cl.
CPC .............. *H04L 65/70* (2022.05); *H04L 65/65* (2022.05); *H04N 19/146* (2014.11); *H04N 19/176* (2014.11)

(58) Field of Classification Search
CPC ... H04L 65/607; H04L 65/608; H04N 19/146; H04N 19/176
See application file for complete search history.

(56) References Cited

U.S. PATENT DOCUMENTS 10,708,331 B1 * 7/2020 Joliveau ............... H04L 65/608
2006/0239343 A1 10/2006 Mohsenian
(Continued)

FOREIGN PATENT DOCUMENTS

| EP | 3529989 A1 | 8/2019 |
| WO | 2013068567 A1 | 5/2013 |
| WO | 2014190308 A1 | 11/2014 |

OTHER PUBLICATIONS

Damien Schroeder, et al., "Efficient Multi-Rate Video Encoding for HEVC-Based Adaptive HTTP Streaming", Jan. 2018, IEEE Transactions on Circuits and Systems for Video Technology, vol. 28, No. 1, pp. 143-157 (Year: 2018).*
(Continued)

*Primary Examiner* — Jonathan A Bui
(74) *Attorney, Agent, or Firm* — Marton Ribera Schumann & Chang LLP; Chien-Ju Alice Chuang; Hector J. Ribera

(57) ABSTRACT

According to embodiments of the disclosure, information of higher and lower quality encoded video segments is used to limit Rate-Distortion Optimization (RDO) for each Coding Unit Tree (CTU). A method first encodes the highest bit-rate segment and consequently uses it to encode the lowest bit-rate video segment. Block structure and selected reference frame of both highest and lowest bit-rate video segments are used to predict and shorten RDO process for each CTU in middle bit-rates. The method delays just one frame using parallel processing. This approach provides time-complexity reduction compared to the reference software for middle bit-rates while degradation is negligible.

24 Claims, 9 Drawing Sheets

(51) Int. Cl.
  *H04N 19/176* (2014.01)
  *H04L 65/65* (2022.01)

(56) References Cited

U.S. PATENT DOCUMENTS

| | | | |
|---|---|---|---|
| 2011/0305273 A1 | 12/2011 | He et al. | |
| 2015/0030071 A1* | 1/2015 | Heng | H04N 19/513 |
| | | | 375/240.16 |
| 2016/0205407 A1* | 7/2016 | Carmel | H04N 19/147 |
| | | | 375/240.01 |
| 2021/0099739 A1* | 4/2021 | Weil | H04N 21/2187 |

OTHER PUBLICATIONS

Schroeder et al., "Efficient Multi-Rate Video Encoding for HEVC-Based Adaptive HTTP Streaming", IEEE, vol. 28, No. 1, Aug. 10, 2016, pp. 143-157.
Guo et al., "Fast Block Structure Determination in AV1-based Multiple Resolutions Video Encoding", arxiv.org, pp. 1-7.
International Application No. PCT/EP2020/059448, Invitation to Pay Additional Fees dated Mar. 15, 2021 12 pages.

* cited by examiner

FAST MULTI-RATE ENCODING FOR ADAPTIVE HTTP STREAMING

BACKGROUND OF INVENTION

This disclosure generally relates to encoding of video or other media, and more particularly to the encoding of video titles using a customized multi-pass approach.

Due to the increasing availability of mobile high-speed Internet connections like WLAN/3G/4G/5G and the huge smartphone and tablet device boom in the recent years, mobile video streaming has become an important aspect of modern life. Online video portals like YouTube or Netflix deploy progressive download or adaptive video on demand systems and count millions of users watching their content every day. Real-time entertainment produces already nearly 50% of the U.S. peak traffic nowadays. This volume is expected to increase as the distribution of content worldwide moves to streaming platforms and stream size increases with additional audio-visual quality features, e.g., HDR, Atmos, etc., and with higher and higher resolutions, transitioning from 1080p to 4K, 8K, and future developed resolution standards. Moreover, particularly for mobile environments, adaptive streaming is required to cope with the considerable high fluctuations in available bandwidth. The video stream has to adapt to the varying bandwidth capabilities in order to deliver the user a continuous video stream without stalls at the best possible quality for the moment, which is achieved, for example, by dynamic adaptive streaming over HTTP.

In this context, adaptive streaming technologies, such as the ISO/IEC MPEG standard Dynamic Adaptive Streaming over HTTP (DASH), Microsoft's Smooth Streaming, Adobe's HTTP Dynamic Streaming, and Apple Inc.'s HTTP Live Streaming, have received a lot of attention in the past few years. These streaming technologies require the generation of content of multiple encoding bitrates and varying quality to enable the dynamic switching between different version of a title with different bandwidth requirements to adapt to changing conditions in the network. For example, FIG. 1 illustrates various representations of a "Cactus" sequence encoded at different resolutions and qualities. The raw video 100 is encoded at various resolutions, including 8K, 4K, 1080p, 720p, and 360p (by way of example), to produce different resolution video sequences 101. At each resolution, the same sequence is also encoded at different qualities 102 with different quantization parameters (QP), for example QP22 and QP36. For illustration, a blow up of a tile for the 1080p encoded sequence is shown at QP22 103a and at QP36 103b. Hence, it is important to provide easy content generation tools to developers to enable the user to encode and multiplex content in segmented and continuous file structures of differing qualities with the associated manifest files.

Existing encoder approaches allow users to quickly and efficiently generate content at multiple quality levels suitable for adapting streaming approaches. For example, a content generation tool for MPEG-DASH video on demand content has been developed by Bitmovin, Inc. (San Francisco, Calif.), and it allows users to generate content for a given video title without the need to encode and multiplex each quality level of the final DASH content separately. The encoder generates the desired representations (quality/bitrate levels), such as in fragmented MP4 files, and MPD file, based on a given configuration, such as for example via a RESTful API. Given the set of parameters the user has a wide range of possibilities for the content generation, including the variation of the segment size, bitrate, resolution, encoding settings, URL, etc. Using batch processing, multiple encodings can be automatically performed to produce a final DASH source fully automatically.

MPEG-DASH videos are divided into segments and each segment is encoded at different rates and resolutions into what are called representations. The representations are stored on an HTTP server accessible by streaming clients via a network, like the Internet. A streaming client, based on current network conditions, can adaptively select the appropriate representation for each segment. With emergence of devices capable of reproducing video content at different resolutions, and the wide availability of high-resolution displays, the required number of representations for a given title is increasing. This can strain the storage demands put on servers that make video content available over the network. Thus, compression of multiple representations to be stored in the server needs a highly efficient video encoder.

Nowadays, video encoders using newer encoding protocols, like HEVC, provide higher efficiency than encoders using previous standards, like H.264/AVC, which can typically require using more tools at the cost of encoding time-complexity. The time-complexity increase is more critical when encoding of the same video content into different representations is required, making it more challenging, especially for live DASH streaming content. Although these representations are encoded independently, they show high redundancy that can be used to predict decisions in the encoding process, consequently decreasing the encoding time-complexity.

The HEVC standard introduced the concept of Coding Tree Units (CTUs), an efficient and time complex tool to encode the frames of a video. In HEVC, frames are divided into tiles or slices which are further divided into CTUs with pre-determined size of up to 64×64 pixels. FIG. 2A illustrates an example CTU 200 for an HEVC encoded frame. Each CTU can be recursively divided into multiple equal-sized square regions called coding units (CUs) 201. Thus, the CTU can be divided into CUs 201a of a larger size than can then be divided into smaller size CUs 201b, which can also be divided into even smaller CUs 201c. As illustrated in FIG. 2B, each division of the CTU increases the depth of a CU by 1, e.g. 64×64 is depth 0 and 8×8 is depth 3. Each CU may have one or more Prediction Units (PUs), which allow multiple different irregular shapes to encode each CU according to two different prediction types, i.e., Intra and Inter modes. In Inter mode, to find the optimal motion vector, multi-reference motion estimation is used.

In an HEVC encoder, finding the optimal CU depth structure for a CTU can be done using a brute force approach to find the structure with the least rate distortion (RD) cost, for example using a Lagragian multiplier. However, this approach takes the largest amount of time in the encoding process. High-motion areas of a CTU are usually given smaller CUs in HEVC. In addition, PU mode decision processing to find the optimal PU mode for each CU imposes additional time-complexity to efficiently encode a CTU. Besides CTU depth structure and PU mode decision, the search process to find optimal prediction type, reference frame and motion vector causes high computational complexity for an HEVC encoder.

Co-located CTUs, located in the same position of the same frame, of a video encoded at different bit-rates show some similarities that are exploited in fast multi-rate encoding methods. Some existing approaches first encode the highest quality representation which is called reference encoding using unmodified HEVC. Thereafter, the block structure of the each encoded CTU is used to predict the block structure of the current CTU in lower quality representations (dependent encoding). It is observed that the higher the quality is, the higher the depths of CTUs are. Based on this observation, CUs that have less depth than the co-located CU in the higher quality are skipped from the search leading to time-savings in the encoding process. Other approaches reuse block structure of reference encoding's CTUs in lower resolution representations. As CTUs in various resolutions are not matched, a matching algorithm is used to derive the block structure from a high resolution reference encoding. For example, such a prior approach is based on two previously explained algorithms which reuse the block structure of the reference encoding to skip searching higher depths in the lower quality and lower resolution representations.

In other prior approaches, a video segment is first encoded at the lowest resolution and then, features, such as motion vectors and CTU block structure, are exploited to limit search process for encoding the higher bit-rate representations. A scalable quality HEVC encoder has also been proposed based on CTUs. Three different ways were defined based on trade-off between coding efficiency and time-complexity reduction. These approaches use CU size of High Bit-rate (HBR) bit-stream as a lower bound in the Lower Bitrate (LBR) decisions. In the cases that higher time-complexity reduction is required, based on required bit-rate, searching the same size CU is skipped and just the lower depth CUs are searched.

In yet other prior approaches, motion estimation is only done for high bit-rate/reference representation and motion compensation is done in the discrete cosine transform (DCT) domain. These approaches eliminate the need for motion estimation for lower bit-rate representations. Alternatively, a machine learning method, e.g. Random Forest, may be used to predict the information that will be used for encoding remaining representations. The algorithm can use information of blocks in the fully encoded representation that are in the same location as current block to predict block structure of the current block. Features are chosen as blocks in variance of the transform coefficients, motion vector variance and information about block structure. Others have proposed a fast block structure determination method for AV1 encoders. The similarity of block structure between different resolutions is used to decide early termination in the Rate Distortion Optimization (RDO) process. This leads to accelerating encoding high-resolution representation reusing low-resolution encoding results. As reviewed above, these algorithms are mainly focused on skipping the searching of higher-depths in CTUs using instead information from higher-quality representations.

Considering the large number of representations that are typically needed for a given title, encoding time-complexity in multi-rate encoding systems is a significant challenge. Thus, what is needed is an efficient encoding approach that provides an optimized encoding for a given title without significantly impacting the encoding performance.

BRIEF SUMMARY

The present disclosure provides for techniques relating to fast multi-rate encoding for adaptive HTTP streaming. A method for encoding of HEVC video at multiple quality levels includes: encoding a first segment at a highest quality level of the multiple quality levels; encoding a second segment at a lowest quality level of the multiple quality levels; determining a block structure and reference frame parameters from the first segment and the second segment; encoding a plurality of segments at one or more quality levels between the highest quality level of the first segment and the lowest quality level of the second segment, the encoding based at least in part on the determined block structure and reference frame; and outputting an HEVC encoded video at a plurality of quality levels comprising the highest quality level, the lowest quality level and the one or more quality levels. In some examples, the encoding of the plurality of segments is performed substantially in parallel. In some examples, encoding the first segment at the highest quality level comprises encoding at a highest bitrate and encoding the second segment at the lowest quality level comprises encoding at a lowest bitrate. In some examples, information from encoding the first segment is used in encoding the second segment. In some examples, the determined block structure and reference frame are configured to shorten a rate distortion optimization process for encoding the plurality of segments. In some examples, encoding the first segment, the second segment and the plurality of segments uses an encoder configuration comprising a parameter for controlling content generation. In some examples, the parameter comprises one or more of a segment size, a bitrate, a resolution, and an encoding setting.

In some examples, the method further includes storing the HEVC encoded video at the plurality of quality levels in a storage. In some examples, the storage comprises a cloud-based storage. In some examples, the storage comprises a content delivery network.

A system for encoding HEVC video at multiple quality levels, the system may include one or more computers and one or more storage devices, the one or more storage devices storing instructions that when executed cause the one or more computers to implement an encoding system that includes an encoder service configured to encode video content; an encoder coordinator node supported by a machine learning module; and one or more encoder nodes configured to perform encodings. In some examples, the encoding system is cloud-based. In some examples, the encoder service supports a plurality of formats and a plurality of codecs. In some examples, the encoder service supports a plurality of streaming protocols. In some examples, the one or more encoder nodes is further configured to instantiate a plurality of encoder submodules. In some examples, the one or more encoder nodes is further configured to connect an input to an output. In some examples, the one or more encoder nodes is further configured to apply a codec configuration on an input video file. In some examples, the one or more encoder nodes is further configured to implement a given encoder configuration. In some examples, the encoder configuration is provided by the encoder coordinator node. In some examples, the one or more encoder nodes is configured to apply a filter on an input video file. In some examples, the one or more encoder nodes is configured to extract and embed one or both of a caption and a subtitle. In some examples, the one or more storage devices comprises a cloud-based storage configured to store a video input file to be encoded by the encoding system. In some examples, the one or more storage devices comprises a cloud-based storage configured to store a video output file encoded by the encoding system. In some examples, the one or more storage devices comprises a content delivery network.

BRIEF DESCRIPTION OF THE DRAWINGS

Various non-limiting and non-exhaustive aspects and features of the present disclosure are described herein below with references to the drawings, wherein.

Like reference numbers and designations in the various drawings indicate like elements. Skilled artisans will appreciate that elements in the Figures are illustrated for simplicity and clarity, and have not necessarily been drawn to scale, for example, with the dimensions of some of the elements in the figures exaggerated relative to other elements to help to improve understanding of various embodiments. Common, well-understood elements that are useful or necessary in a commercially feasible embodiment are often not depicted in order to facilitate a less obstructed view of these various embodiments.

DETAILED DESCRIPTION OF EMBODIMENTS

The following description describes certain embodiments by way of illustration only. One of ordinary skill in the art will readily recognize from the following description that alternative embodiments of the structures and methods illustrated herein may be employed without departing from the principles described herein. Reference will now be made in detail to several embodiments.

The above and other needs are met by the disclosed methods, a non-transitory computer-readable storage medium storing executable code, and systems for encoding video content. The redundancy that exists between co-located CTUs in different representations is exploited to reduce the encoding complexity. To do so, information of co-located encoded CTUs in highest and lowest qualities are used to limit search process of each CTU. In methods according to this disclosure, searching in higher depths and lower depths CTUs is skipped based on co-located CTUs in highest and lowest quality representations of the content.

Figure 1:
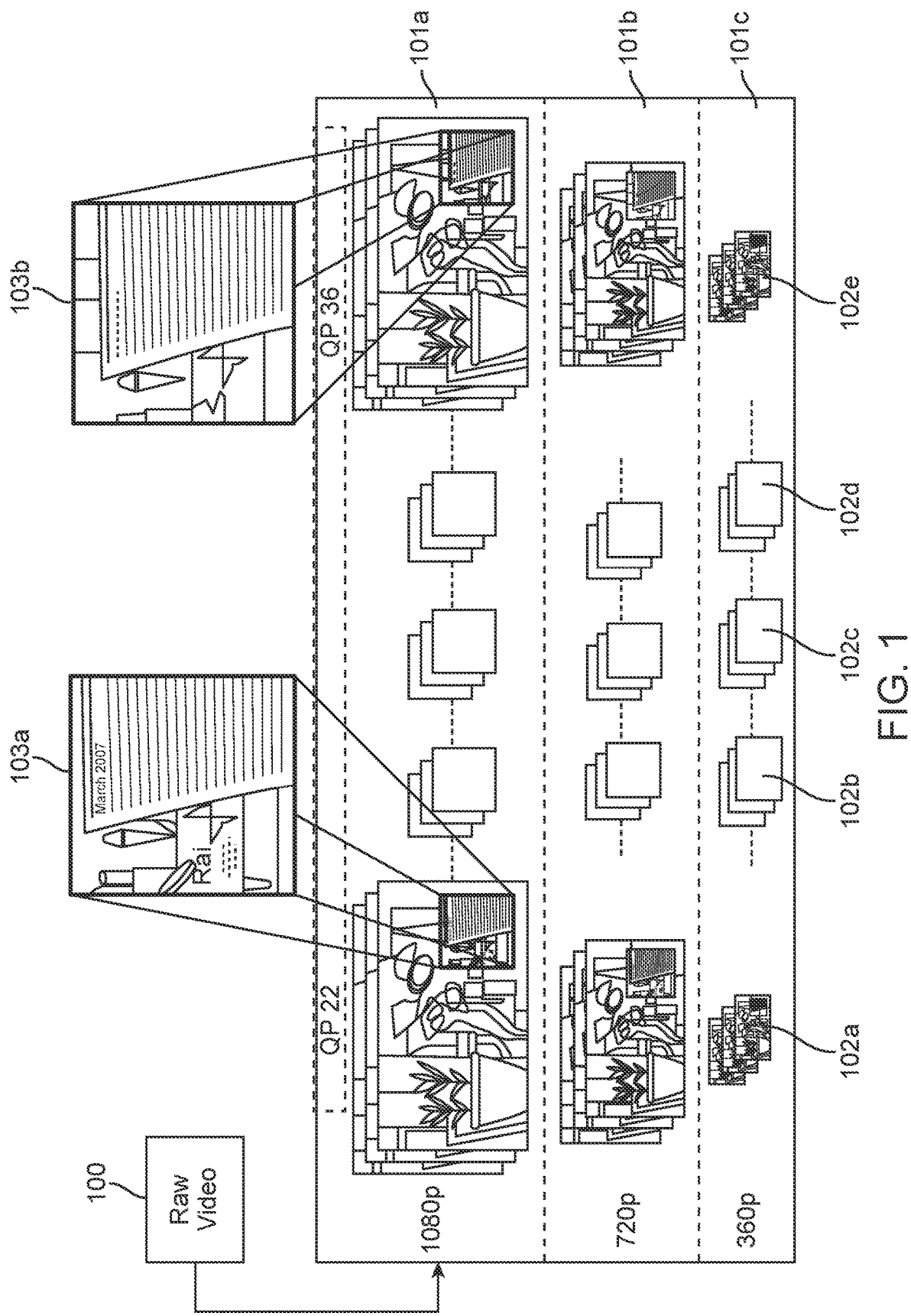
FIG. 1 is a diagram illustrating multiple representations of a video at different encoding rates and qualities, in accordance with one or more embodiments.
Figures 2A, 2B:
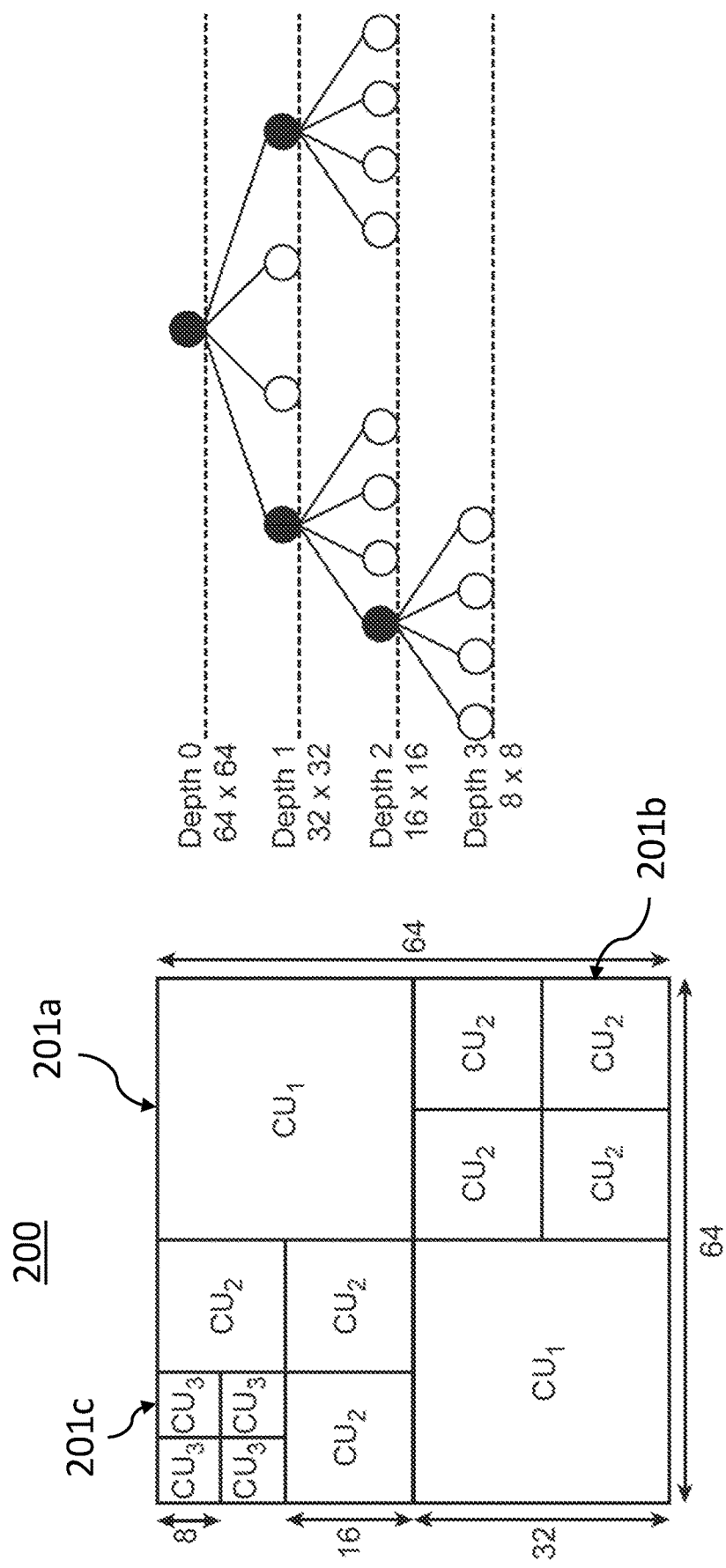
FIG. 2A is a diagram illustrating an HEVC Coding Tree Unit for a frame, in accordance with one or more embodiments.
FIG. 2B is a diagram illustrating an HEVC Coding Tree Unit block structure, in accordance with one or more embodiments.
Figure 3:
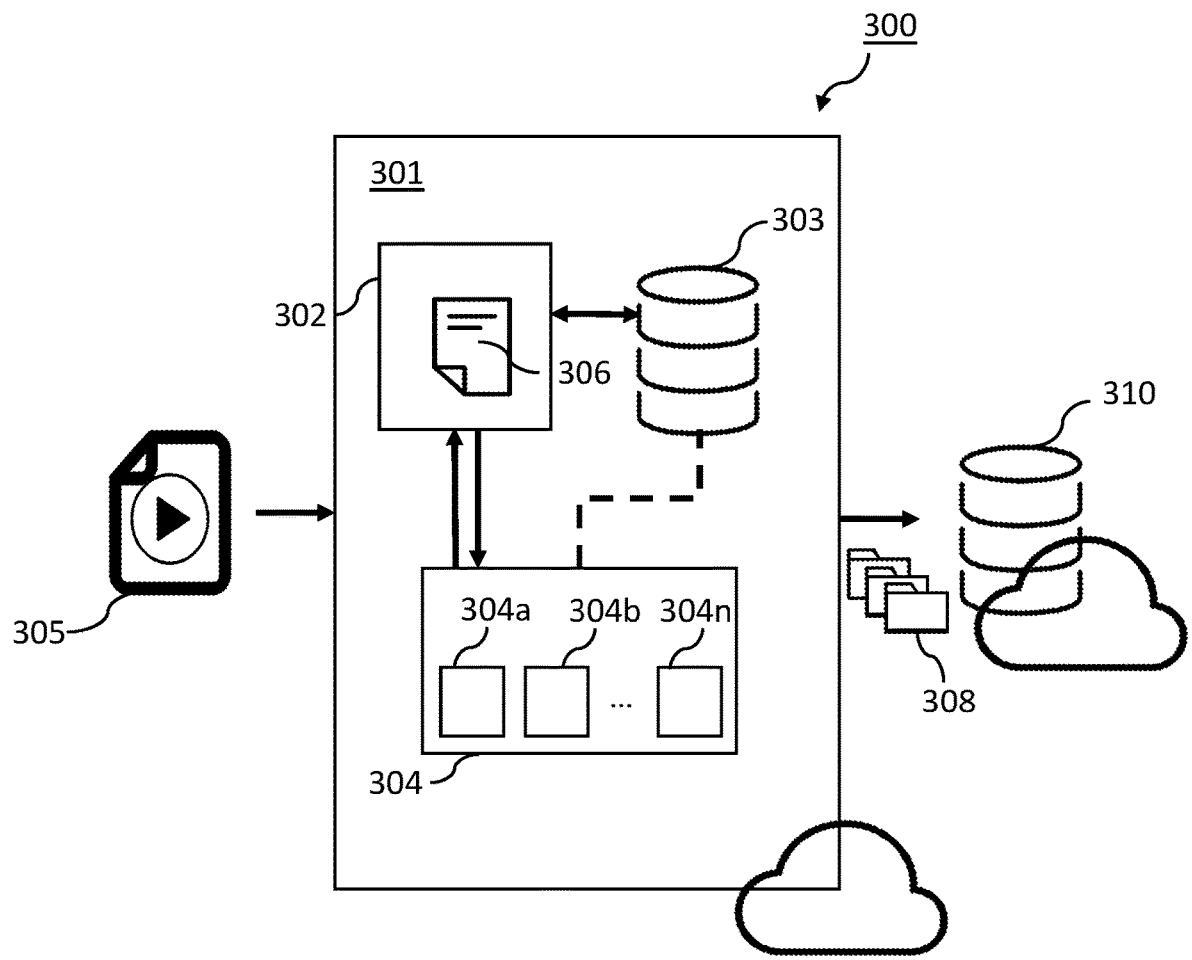
FIG. 3 is a block diagram illustrating an exemplary content encoding system, in accordance with one or more embodiments.

Now referring to FIG. 3, a content encoding system is illustrated according to embodiments of the invention. In one embodiment, the encoding system 300 is a cloud-based encoding system available via computer networks, such as the Internet, a virtual private network, or the like. The encoding system 300 and any of its components may be hosted by a third party or kept within the premises of an encoding enterprise, such as a publisher, video streaming service, or the like. The encoding system 300 may be a distributed system but may also be implemented in a single server system, multi-core server system, virtual server system, multi-blade system, data center, or the like. The encoding system 300 and its components may be implemented in hardware and software in any desired combination within the scope of the various embodiments described herein.

According to one embodiment, the encoding system 300 includes an encoder service 301. The encoder service 301 supports various input and output formats (e.g., HTTP, FTP, AWS-S3, GCS, Aspera, Akamai NetStorage, etc.) and multiple codecs (H264, H265, VP9, AV1, AAC, etc.) for encoding video content, for example, for VoD and live streaming applications. It also supports streaming protocols like MPEG-DASH and HLS and may be integrated with Digital Rights Managers (DRMs) like Widevine, Playready, Marlin, PrimeTime, Fairplay, and the like. According to embodiments, the encoder service 301 is a multi-cloud service capable of dynamically scaling with generation of processing nodes to support the workload. In one embodiment, for a particular encoding process, the encoder service 301 can generate an encoder coordinator node 302 supported by a machine learning module 303 and one or more encoder nodes 304.

According to embodiments, encoder nodes 304 can instantiate any number of encoder instances or submodules 304a, 304b, . . . , 304n, each capable of encoding an input video into an encoding format. The encoder node 304 performs the encodings, connecting inputs to outputs, applying codec configurations and filters on the input video files. The encoders can apply different and multiple muxings on streams like MPEG2-TS, fragmented MP4 and progressive MP4 and add DRM to the content and/or encrypted it as needed. Encoder node 304 can also extract and embed captions and subtitles, e.g., 608/708, WebVTT, SRT, etc.

For example, encoding submodule 304a may be an MPEG-DASH encoding submodule for encoding an input video 305 into a set of encoded media 308 according to the ISO/IEC MPEG standard for Dynamic Adaptive Streaming over HTTP (DASH). The encoding submodules 304b-304n may provide encoding of video for any number of formats, including without limitation Microsoft's Smooth Streaming, Adobe's HTTP Dynamic Streaming, and Apple Inc.'s HTTP Live Streaming. In addition, encoding submodules 304b-304n may use any type of codec for video encoding, including, for example, H.264/AVC, H.265/HEVC, VP8, VP9, AV1, and others. Any encoding standard or protocol may be supported by the encoder node 304 by providing a suitable encoding submodules with the software and/or hardware required to implement the desired encoding. In addition, in embodiments, encoder node 304 may be distributed in any number of servers in hardware, software, or a combination of the two, networked together and with the encoder coordinator node 302. It should be noted that in simpler implementations, a simple encoder system can include a single encoding node that may be programmed to operate according to any desired standard using the appropriate codec software.

According to one aspect of embodiments of the invention, the encoder node 304 encodes an input video 305 at multiple bitrates with varying resolutions into a resulting encoded media 308. For example, in one embodiment, the encoded media 308 includes a set of fragmented MP4 files encoded according to the H.264 video encoding standard and a media presentation description ("MPD") file according to the MPEG-DASH specification. In an alternative embodiment, the encoding node 304 encodes a single input video 305 into multiple sets of encoded media 308 according to multiple encoding formats, such as MPEG-DASH and HLS for example. Input video 305 may include digital video files or streaming content from a video source, such as a camera, or other content generation system. According to embodiments, the encoder node 304 processes a video file in time-based chunks corresponding to portions of the input video file 305. Encoding submodules 304a-n process the video chunks for a given input video file substantially in parallel, providing a faster encoding process than serially processing the video file 305. The encoder node 304 is capable of generating output encoded in any number of formats as supported by its encoding submodules 304a-n.

According to another aspect of various embodiments, the encoder node 304 encodes the input video based on a given encoder configuration 306. The encoder configuration 306 can be received into the encoding system 301, via files, command line parameters provided by a user, via API calls, HTML commands, or the like. According to one embodiment, the encoder configuration 306 may be generated or modified by the encoder coordinator node 302 and/or the machine learning module 303. The encoder configuration 306 includes parameters for controlling the content generation, including the variation of the segment sizes, bitrates, resolutions, encoding settings, URL, etc. For example, according to one embodiment, the input configuration 306 includes a set of target resolutions desired for encoding a particular input video 305. In one embodiment, the target resolutions are provided as the pixel width desired for each output video and the height is determined automatically by keeping the same aspect ratio as the source. For example, the following pixel-width resolutions may be provided 384, 512, 640, 768, 1024, 1280, 1600, 1920, 2560, 3840. In this embodiment, the encoded output 308 includes one or more sets of corresponding videos encoded in one or more encoding formats for each specified resolution, namely, 384, 512, 640, 768, 1024, 1280, 1600, 1920, 2560, and 3840. In one embodiment, a set of fragmented MP4 files for each resolution is included in the encoded output 308. According to yet another aspect of various embodiments, the encoder configuration 306 is customized for the input video 305 to provide an optimal bitrate for each target resolution.

According to another aspect of various embodiments, the encoded output 308 is then delivered to storage 310. The encoding service 301 can connect to cloud-based storage as an output location to write the output files. The specific location/path may be configured for each specific encoding according to embodiments. For example, in one embodiment, storage 310 includes a content delivery network ("CDN") for making the encoded content 308 available via a network, such as the Internet. The delivery process may include a publication or release procedure, for example, allowing a publisher to check quality of the encoded content 308 before making available to the public. In another embodiment, the encoded output 308 may be delivered to storage 310 and be immediately available for streaming or download, for example, via a website.

According to embodiments, encoding submodules 304a-n are configured to encode a video file 305 using HEVC encoding. The encoding submodules may process the video chunks for a given input video file substantially in parallel, providing a faster encoding process than serially processing the video file 305. In HEVC, the encoding process entails searching for the optimal partition of each Coding Unit Tree (CTU) with the lowest distortion. Encoding submodules 304a-n use information of higher and lower quality encoded versions of the video content to limit the Rate-Distortion Optimization (RDO) for each CTU in the other versions. Given the redundancy inherent in encoding the same video file 305 at different bit-rates, it has been shown that with increasing bit-rate the partitioning of CTUs tend to take higher depths; that is, for co-located CTUs in the video content, e.g., same position of same frame, in the higher bit-rate representation, the CTU is likely to have more partitions or higher depths. Therefore, it is assumed that a CTU at the highest bit-rate will have higher depths compared with the co-located CTUs in the lower bit-rate representations. Based on this assumption, conventional methods use depth of CTUs in the highest bit-rate as a bound to eliminate searching for partitions with larger depths than the co-located CTU in the highest bit-rate. Although this method leads to considerable time-complexity reduction, it is not the most efficient method. This is because: (i) when larger depths are dominant in highest-quality representations, like in those of fast movement video sequences, there is no efficiencies to be gained since all the potential partitions of co-located CTUs will have to be searched to the deepest options, thus the encoder would act as an unmodified video encoder, without gaining in efficiency, and (ii) encoding according to this approach does not result in skipping the lowest depths, which are the largest and consequently the most time-consuming CUs when in fact it may be unnecessary to search these options.

Figure 4:
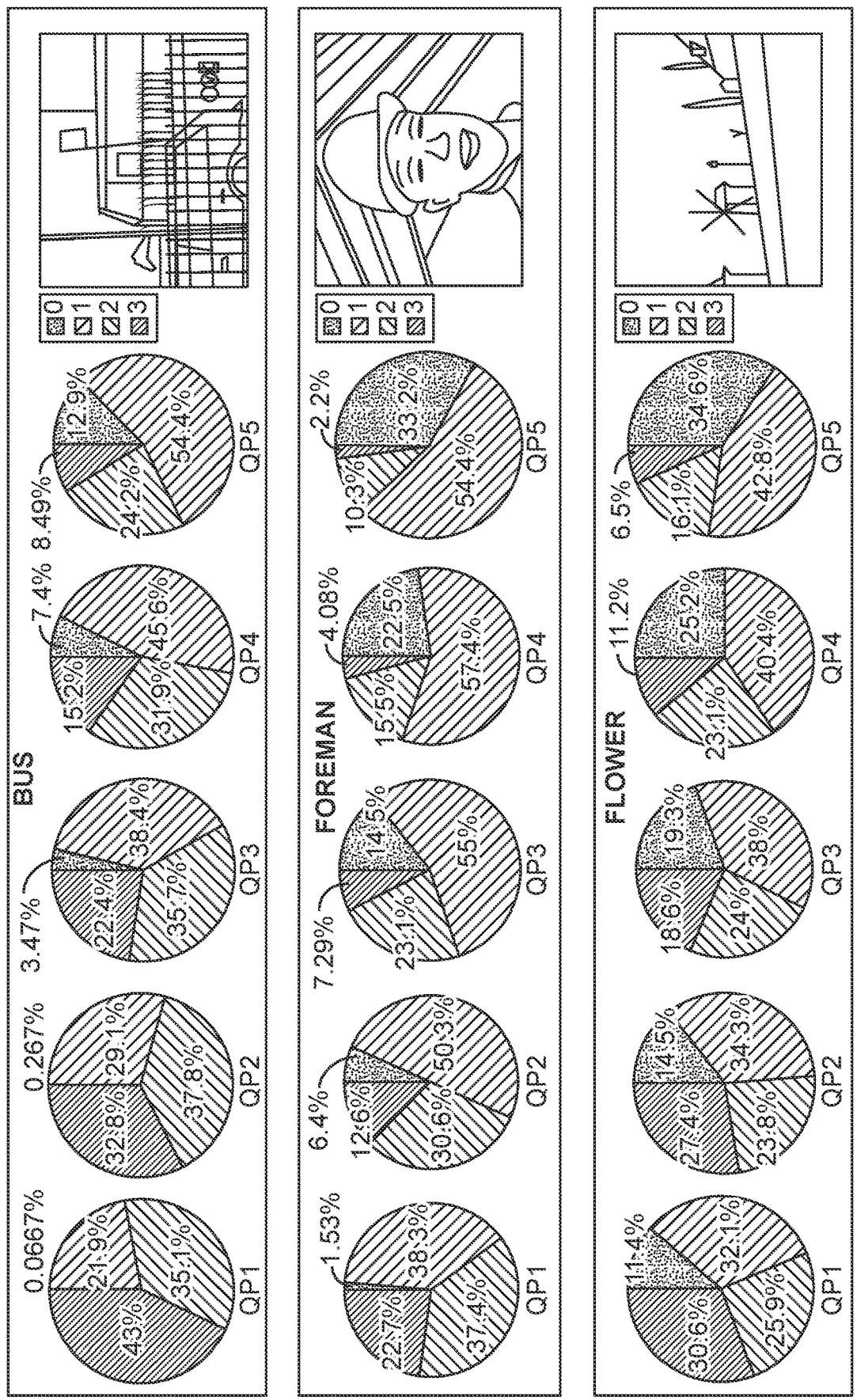
FIG. 4 is a set of charts illustrating percentage of depths of CTU structures at various qualities for three exemplary video sequences, in accordance with one or more embodiments.

For example, in FIG. 4, percentage of depths {0,1,2,3} at various qualities {QP1=22, QP2=26, QP3=30, QP4=34, QP5=38} are shown using unmodified HEVC for sequences BUS, FOREMAN, and FLOWER. In the sequence BUS, even in the lower quality representations (QP1 and QP2) there are few depth 0 CUs, less than 1%, as the optimal CU size. Thus, predicting this depth for the optimal cases but skipping for most cases can lead to time-savings. This illustration also shows that, in the highest quality representation, QP5, higher percentage of larger depths, i.e., depths 2 and 3, account for about 75% of the CUs, thus the efficiencies provided by skipping the searching of larger depths are not that significant.

Figure 5:
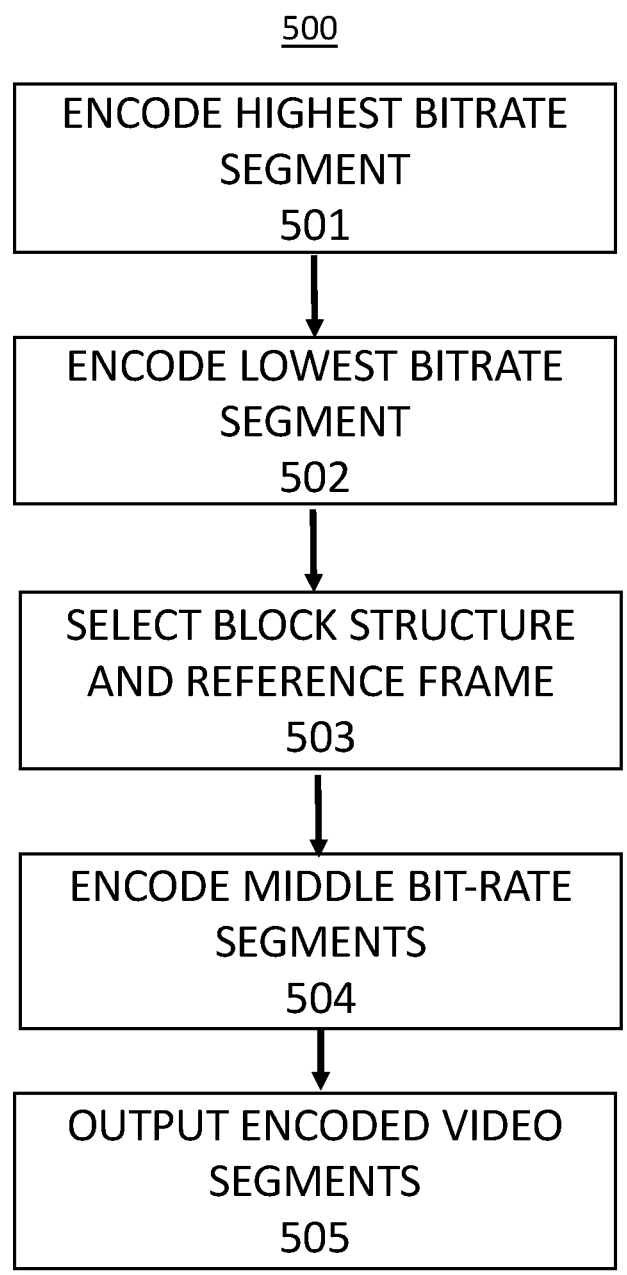
FIG. 5 is a flowchart illustrating an exemplary method for encoding MPEG-DASH video segments at multiple bit-rates using HEVC encoding, in accordance with one or more embodiments.

Now referring to FIG. 5, a method for encoding MPEG-DASH video segments at multiple bit-rates using HEVC encoding is provided. The method uses CTUs as an efficient and time complex tool to encode the frames of an input video. The HEVC frames are divided into tiles and further divided into CTUs with pre-determined size of n×n. Each CTU is then divided further into square coding units (CUs). According to one embodiment, for a given video content, the highest bit-rate segment is first encoded 501. Then the lowest bit-rate video segment is encoded 502 using information derived from the highest bit-rate segment. For example, for co-located CTUs in the lowest bitrate segment, the maximum depth of the CTU in the highest bitrate segment is used as an upper bound, skipping the search of those higher depths in the lowest bitrate version. Then, the block structure and reference frame of both highest and lowest bit-rate video segments are selected 503. Having information of both lowest and highest representations can lead to limiting some search processes of CTUs in the middle quality representations. This information can be used for (i) CU structure decision, (ii) PU mode decision, (iii) prediction type, (iv) motion estimation, and (v) reference frame selection. CTUs in the middle bit-rate segments are then encoded 504 using the selected block structure and reference frames to predict and shorten RDO process for encoding each CTU in middle bit-rates. The encoded video segments at the various bit-rates are then output 505. According to embodiments, the method 500 delays just one frame using parallel processing. This approach provides time-complexity reduction compared to the reference software for middle bit-rates while degradation is negligible.

Figure 7A:
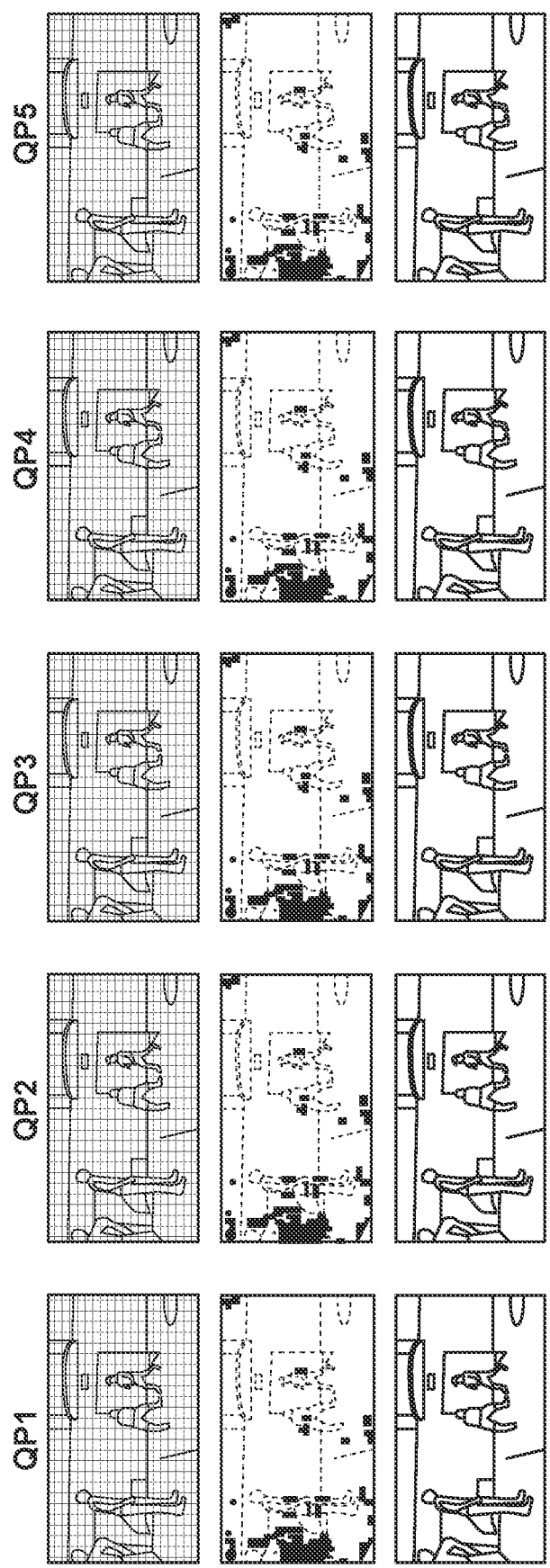
FIG. 7A is a set of images illustrating example block structure, PU mode, motion vectors, and prediction type of one frame of a video sequence in five different-quality representations, in accordance with one or more embodiments.

By way of example, FIG. 7A shows block structure, PU mode, motion vectors, and prediction type of one frame in five representations of different qualities, QP1-QP5, for frame 178 of the "Basketball Drive" sequence. As shown, CUs in the middle qualities have depths mostly between lowest and highest qualities. Motion vectors and prediction show similar behavior for all the representations. At least, for the cases that CUs in the highest and lowest qualities have the same information with high probability, co-located CUs in the middle qualities show the same information.

Figure 7B:
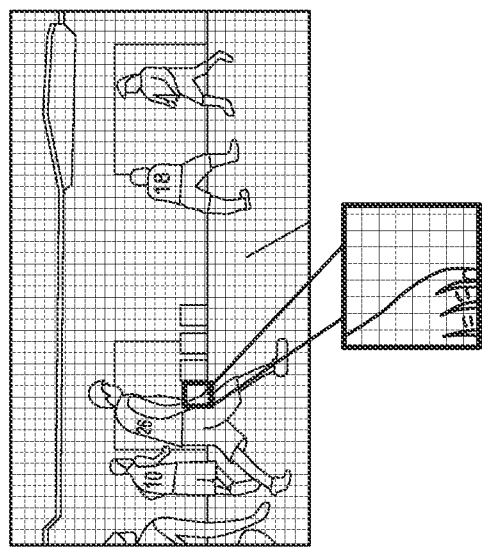
FIG. 7B is a set of images illustrating example coding units in co-located frames of a video in three different encodings, in accordance with one or more embodiments.
Figure 7B:
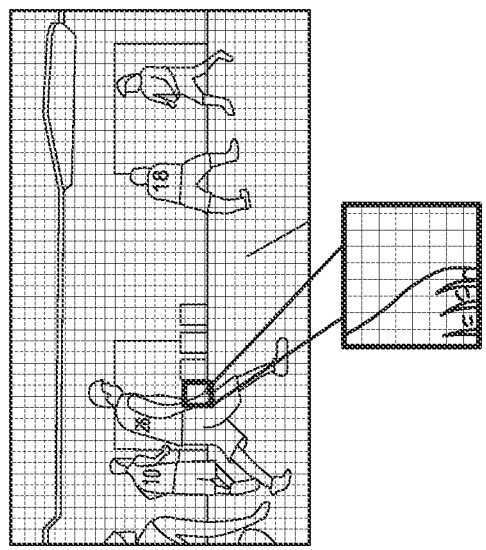
Figure 7B:
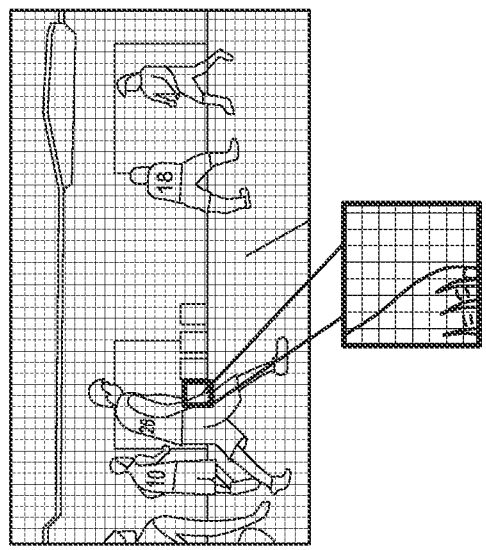

An analysis of the probability of CUs in the middle representations that have depths between highest and lowest qualities shows that such probabilities are high. Smaller depths than the co-located CU in the lowest quality frame and larger depths than the co-located CU in the highest quality frame can be skipped from the searching process with high confidence. FIG. 7B shows an example in which the smallest depth for the optimal CTU structures of the middle QP frames has depths between highest and lowest quality where the larger depth is 2.

Figure 6:
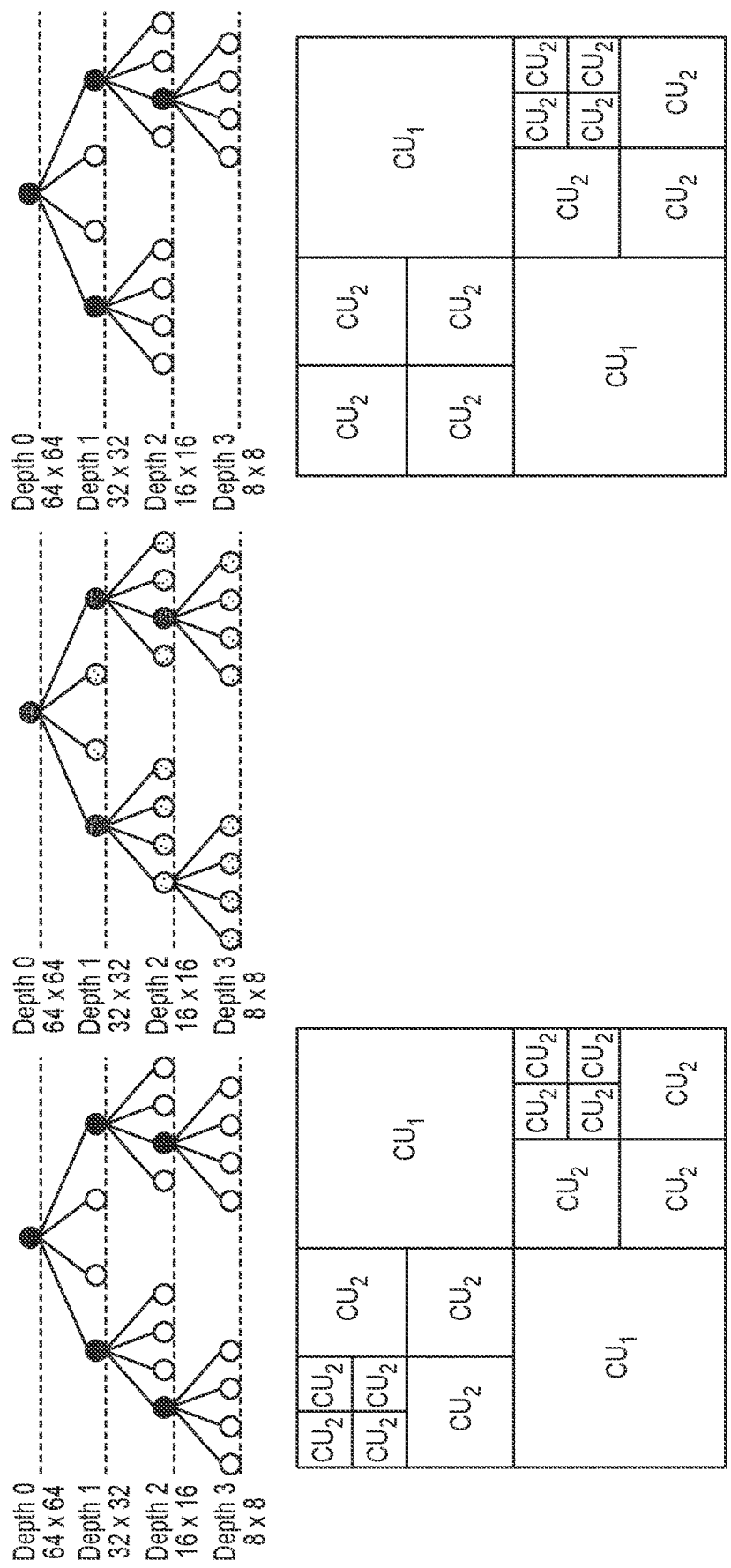
FIG. 6 is an illustration of the application of a method to an exemplary Coding Tree Unit, in accordance with one or more embodiments.

As illustrated in FIG. 6, a method according to embodiments of this disclosure provides a depth elimination approach that reduces the complexity of the search process. As illustrated in FIG. 6, red depths are skipped from searching as they have smaller depth than the lowest quality and blue depths stopped from division to larger depth as they have smaller (or equal) depth than the highest quality representation.

Using unmodified HEVC to encode both highest and lowest quality representations increases total encoding time-complexity. To avoid this, the lowest quality representation is encoded based on information from the highest quality representation. As this representation does not have access to lower quality representation, higher bound depth is considered the worst case and just eliminate searching the depths that are smaller than co-located CUs in the highest quality representation.

Recent video encoders like HEVC use multi reference frame motion estimation to improve efficiency at the cost of time-complexity increase. Simulation results show that if co-located CUs in the highest and lowest quality representations select the same reference frame for motion compensations, intermediate representations with high probability will select the same reference frame. This probability have been calculated for the used dataset. Based on this similarity, for the co-located CUs that select the same reference frame in the lowest and highest qualities, current CU in the co-located intermediate representation selects the same reference frame and skips searching other available reference frames.

Figure 8:
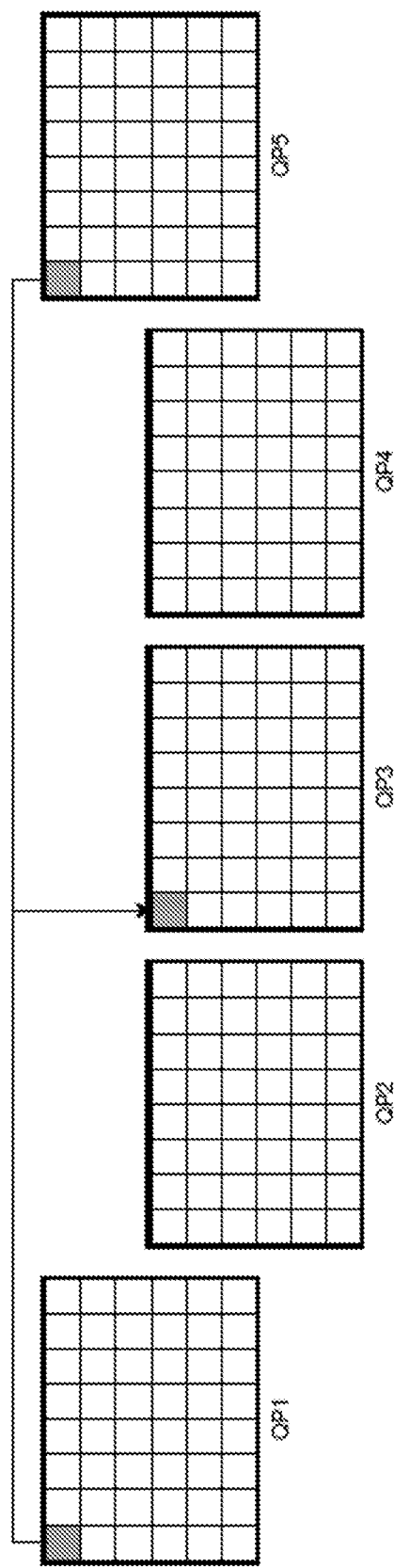
FIG. 8 is a diagram illustrating a parallel encoding approach, in accordance with one or more embodiments.

Now referring to FIG. 8, parallel processing is preferable where high computation process like multi-rate encoding is required. Conventional methods that use information of just highest or lowest quality representation to encode the other representations need to encode just reference representation and using its information to encode the other representations in parallel. The methods according to embodiments of this disclosure encode both highest and lowest quality representations and then encode the intermediate representations in parallel which can lead to increase in total time-complexity. However, it should be noted that as one CTU is encoded in both highest and lowest quality representations its information can be used to encode co-located CTUs in the intermediate representations.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

We claim:

1. A method for encoding of HEVC video at multiple quality levels comprising:
   encoding a first segment at a highest quality level of the multiple quality levels;
   encoding a second segment at a lowest quality level of the multiple quality levels;
   determining a block structure and reference frame parameters from the first segment and the second segment;

encoding a plurality of segments at one or more quality levels between the highest quality level of the first segment and the lowest quality level of the second segment, the encoding based at least in part on the determined block structure and reference frame, the encoding of the plurality of segments including a searching process wherein depths smaller than a lowest quality depth for the second segment and larger than a highest quality depth for the first segment are eliminated from the encoding of the plurality of segments; and outputting an HEVC encoded video at a plurality of quality levels comprising the highest quality level, the lowest quality level and the one or more quality levels.

2. The method of claim 1, wherein the encoding of two or more of the plurality of segments is performed in parallel.

3. The method of claim 1, wherein encoding the first segment at the highest quality level comprises encoding at a highest bitrate and encoding the second segment at the lowest quality level comprises encoding at a lowest bitrate.

4. The method of claim 3, wherein information from encoding the first segment is used in encoding the second segment.

5. The method of claim 1, wherein the determined block structure and reference frame are configured to shorten a rate distortion optimization process for encoding the plurality of segments.

6. The method of claim 1, wherein encoding the first segment, the second segment and the plurality of segments uses an encoder configuration comprising a parameter for controlling content generation.

7. The method of claim 6, wherein the parameter comprises one or more of a segment size, a bitrate, a resolution, and an encoding setting.

8. The method of claim 1, further comprising storing the HEVC encoded video at the plurality of quality levels in a storage.

9. The method of claim 8, wherein the storage comprises a cloud-based storage.

10. The method of claim 8, wherein the storage comprises a content delivery network.

11. A system for encoding HEVC video at multiple quality levels, the system comprising:
one or more computers and one or more storage devices, the one or more storage devices storing instructions that when executed cause the one or more computers to implement an encoding system comprising:
an encoder service configured to encode a first video segment at a highest quality level of multiple quality levels and a second video segment at a lowest quality level of the multiple quality levels;
an encoder coordinator node supported by a machine learning module to determine a block structure and reference frame from the first segment and the second segment; and
one or more encoder nodes configured to perform encoding of a plurality of segments at one or more quality levels between the highest quality level of the first segment and the lowest quality level of the second segment, the encoding based at least in part on the determined block structure and reference frame, the encoding of the plurality of segments including a searching process wherein depths smaller than the lowest quality depth of the second video segment and larger than the highest quality depth of the first video segment are eliminated from the encoding of the plurality of segments.

12. The system of claim 11, wherein the encoding system is cloud-based.

13. The system of claim 11, wherein the encoder service supports a plurality of formats and a plurality of codecs.

14. The system of claim 11, wherein the encoder service supports a plurality of streaming protocols.

15. The system of claim 11, wherein the one or more encoder nodes is further configured to instantiate a plurality of encoder submodules.

16. The system of claim 11, wherein the one or more encoder nodes is further configured to connect an input to an output.

17. The system of claim 11, wherein the one or more encoder nodes is further configured to apply a codec configuration on an input video file.

18. The system of claim 11, wherein the one or more encoder nodes is further configured to implement a given encoder configuration.

19. The system of claim 18, wherein the encoder configuration is provided by the encoder coordinator node.

20. The system of claim 11, wherein the one or more encoder nodes is further configured to apply a filter on an input video file.

21. The system of claim 11, wherein the one or more encoder nodes is further configured to extract and embed one or both of a caption and a subtitle.

22. The system of claim 11, wherein the one or more storage devices comprises a cloud-based storage configured to store a video input file to be encoded by the encoding system.

23. The system of claim 11, wherein the one or more storage devices comprises a cloud-based storage configured to store a video output file encoded by the encoding system.

24. The system of claim 11, wherein the one or more storage devices comprises a content delivery network.

* * * * *